(12) United States Patent
Abendroth et al.

(10) Patent No.: US 7,725,246 B2
(45) Date of Patent: May 25, 2010

(54) METHOD AND START CONTROL DEVICE FOR CONTROLLING AN AUTOMATIC START-UP PROCESS OF A DRIVE UNIT

(75) Inventors: Dirk Abendroth, Munich (DE); Peter Straehle, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/534,574

(22) Filed: Aug. 3, 2009

(65) Prior Publication Data

US 2009/0292455 A1  Nov. 26, 2009

Related U.S. Application Data

(63) Continuation of application No. PCT/EP2008/001411, filed on Feb. 22, 2008.

(30) Foreign Application Priority Data

Feb. 28, 2007  (DE) .................. 10 2007 009 856

(51) Int. Cl.
  *G06F 19/00* (2006.01)
  *F02N 17/00* (2006.01)
  *B60W 10/06* (2006.01)
(52) U.S. Cl. .................. 701/113; 123/179.4; 180/65.28
(58) Field of Classification Search ............. 123/179.3, 123/179.4; 701/112, 113, 115; 180/65.21, 180/65.26, 65.265, 65.28; 903/905
  See application file for complete search history.

(56) References Cited

U.S. PATENT DOCUMENTS 5,616,964 A  4/1997  Peterson, Jr.
6,123,163 A * 9/2000  Otsu et al. .............. 180/65.8
6,763,903 B2  7/2004  Morimoto et al.
7,077,224 B2 * 7/2006  Tomatsuri et al. ...... 180/65.235
7,083,020 B2 * 8/2006  Morimoto et al. ......... 180/65.26
2002/0074173 A1 * 6/2002  Morimoto et al. .......... 180/65.2
2007/0021876 A1 * 1/2007  Isaji et al. ..................... 701/1
2009/0301420 A1 * 12/2009  Abendroth et al. ........ 123/179.4

FOREIGN PATENT DOCUMENTS

| DE | 693 03 547 T2 | 10/1996 |
| DE | 199 06 544 A1 | 8/2000 |
| DE | 101 61 343 A1 | 7/2002 |

(Continued)

OTHER PUBLICATIONS

German Search Report dated Jul. 19, 2007 including partial English translation (Nine (9) pages).

(Continued)

*Primary Examiner*—Willis R Wolfe, Jr.
(74) *Attorney, Agent, or Firm*—Crowell & Moring LLP

(57) ABSTRACT

A method and a start control device are provided for controlling an automatic start-up process of a drive unit of a motor vehicle. The drive unit is automatically started when all of the predetermined start-up conditions are fulfilled. However, even in the event that an absence of the driver is detected, the drive unit automatically starts when the speed of the motor vehicle is greater than a predetermined limit speed and all other start-up conditions are fulfilled.

8 Claims, 1 Drawing Sheet

FOREIGN PATENT DOCUMENTS

| | | |
|---|---|---|
| DE | 102 11 466 C1 | 8/2003 |
| DE | 102 11 463 B3 | 1/2004 |
| DE | 102 51 765 A1 | 5/2004 |
| EP | 0 764 556 A2 | 3/1997 |
| JP | 2002188480 A * | 7/2002 ................. 701/112 |
| JP | 2006112259 A * | 4/2006 ................. 701/112 |
| WO | WO 00/24603 A1 | 5/2000 |
| WO | WO 2006/128900 A1 | 12/2006 |

OTHER PUBLICATIONS

International Search Report dated Jun. 16, 2008 including English translation (Four (4) pages).

* cited by examiner

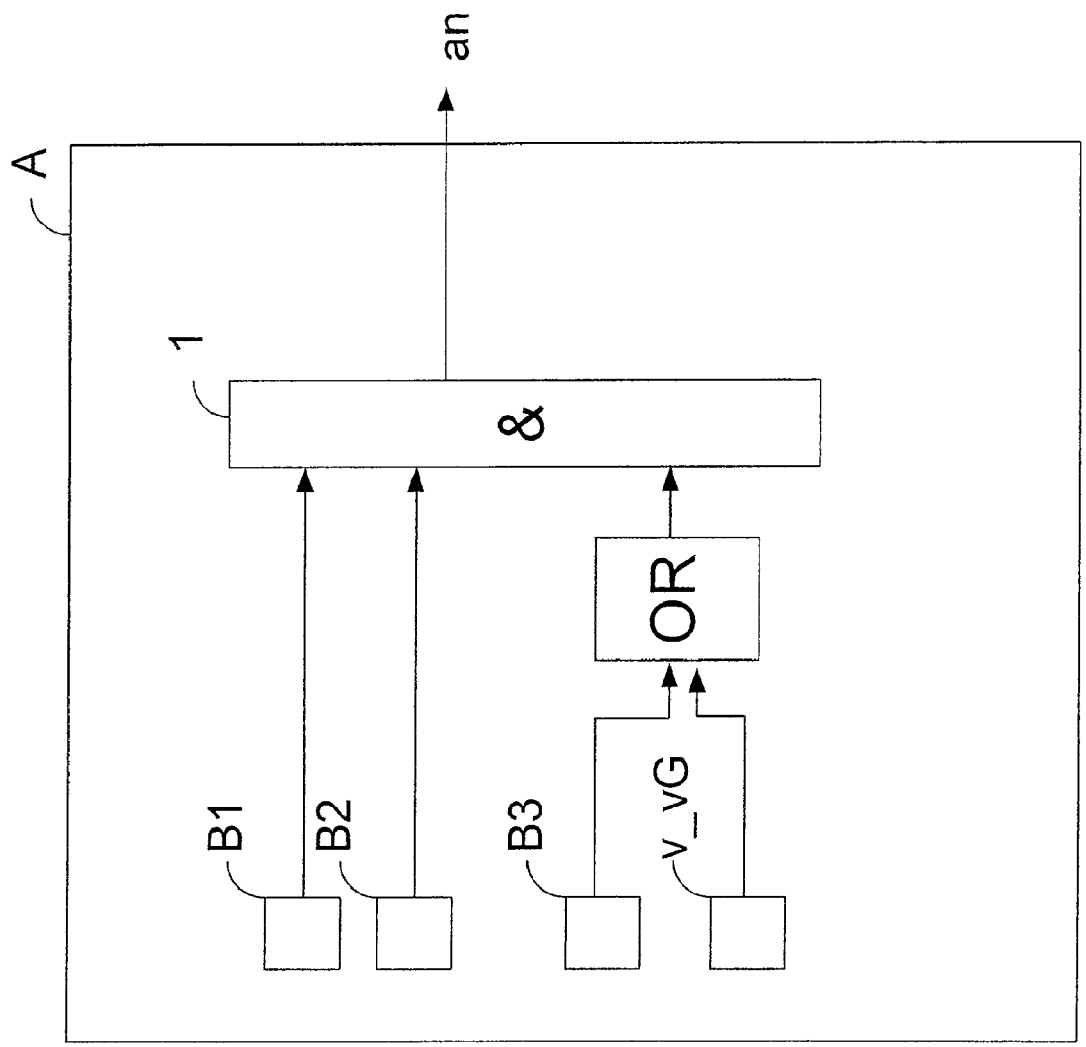

METHOD AND START CONTROL DEVICE FOR CONTROLLING AN AUTOMATIC START-UP PROCESS OF A DRIVE UNIT

CROSS-REFERENCE TO RELATED APPLICATIONS

This application is a continuation of PCT International Application No. PCT/EP2008/001411, filed Feb. 22, 2008, which claims priority under 35 U.S.C. §119 to German Patent Application No. DE 10 2007 009 856.3, filed Feb. 28, 2007, the entire disclosures of which are herein expressly incorporated by reference.

BACKGROUND AND SUMMARY OF THE INVENTION

The invention relates to a method for controlling an automatic startup process of a drive unit of a motor vehicle, whereby the drive unit is automatically started, when all of the predetermined start-up conditions are fulfilled, and whereby one start-up condition consists of the requirement that the absence of the driver may not be detected, as well as a corresponding start control device for controlling an automatic start-up process of a switched-off drive unit of a motor vehicle, whereby the start control device initiates an automatic start-up process, when all of the defined start-up conditions are fulfilled, and whereby one start-up condition consists of the requirement that the absence of the driver may not be detected.

In order to reduce fuel consumption and pollutant emissions, the current trend in vehicle engineering is to develop methods and systems that include a start/stop function. To some extent, such systems and methods have been already installed. This start/stop function automatically switches-off the drive unit in the motor vehicle, which is constructed as an internal combustion engine, under specific conditions and/or in the presence of predetermined shut-off conditions, and automatically re-starts the drive unit in the presence of predetermined start-up conditions. Such methods and systems are suited, above all, for urban traffic in order to reduce the consumption of fuel, because in urban traffic the vehicle often comes to a standstill at traffic lights or owing to the traffic and because it is not necessary to run the internal combustion engine.

Hence, DE 101 61 343 A1 discloses an automatic stop and start controlling device for an internal combustion engine. In this case, the control device implements suitable measures for switching-off the internal combustion engine, when all of the shut-off conditions have been satisfied. When the predetermined start-up measures are fulfilled, the control device implements suitable measures for automatically starting the internal combustion engine.

Furthermore, DE 102 11 463 B3 discloses a method for automatically switching-off and starting-up an internal combustion engine. In one embodiment of the method, an automatic start-up process of an automatically stopped internal combustion engine is carried out, only if, in addition to the fulfilled (other) start-up conditions, all of the vehicle doors are closed. On opening one of the front vehicle doors, no automatic start-up process is initiated. This condition is necessary in order not to initiate an automatic start-up process when there is the possibility that the driver will leave or has left the vehicle.

If the absence of the driver is detected and/or suspected, for example, by the opening of the vehicle door, it is, nevertheless, possible that the driver is present in the vehicle even after the door has been closed and that the driver could and would control the vehicle. Since at this point, however, the absence of the driver is still detected and/or suspected by the opening of the door, even though the driver is sitting in the vehicle, it could be practical under some circumstances, for example, in the event of an imminent hazardous situation, to automatically start the drive unit despite the detected absence of the driver. In the case that the driver is, nevertheless, still sitting in the vehicle, the driver can perform actions that would not be possible or would be possible only with difficulty if the drive unit were switched-off, and with these actions he may avert the hazard. In the case that the driver is, in fact, not sitting in the vehicle, the driver cannot perform, on the one hand, any corresponding actions, but, on the other hand, he will not generate any additional hazards.

The object of the invention is to provide a method and a device for controlling an automatic start-up process, during which, in the presence of certain conditions, an automatic start-up process is initiated, even if not all of the start-up conditions are fulfilled.

This object is achieved by a method for controlling an automatic start-up process of a drive unit of a motor vehicle, whereby the drive unit is automatically started, when all of the predetermined start-up conditions are fulfilled, and whereby one start-up condition consists of the requirement that the absence of the driver may not be detected. Even in the event that the absence of the driver is detected, the drive unit is automatically started when the speed of the motor vehicle is greater than a predetermined limit speed, and the other start-up conditions are met.

This object is further achieved by a start control device for controlling an automatic start-up process of a switched-off drive unit of a motor vehicle, whereby the start control device initiates an automatic start-up process, when all of the defined start-up conditions are fulfilled, and whereby one start-up condition consists of the requirement that the absence of the driver may not be detected. Even in the event that the absence of the driver is detected, the start control device initiates an automatic start-up process when the speed of the motor vehicle is greater than a predetermined limit speed and the other start-up conditions are met. Advantageous further developments are described herein.

A vehicle may find itself in situations, in which despite the detected and/or suspected absence of the driver an automatic start-up process should be initiated. If, for example, the motor vehicle with the switched-off drive unit were to move owing to the slope of the road, the vehicle with the switched-off drive unit can be controlled only with difficulty, since the brake and steering assistance by the internal combustion engine is missing or limited. If despite the detected and/or suspected absence of the driver the driver were, nevertheless, still sitting in the vehicle, he could perform relatively simple actions if the drive unit were switched on, and he could stop the vehicle again or, owing to steering motions, steer clear of impediments. If the driver is, in fact, not sitting in the vehicle, the vehicle would continue to move in an unsteered manner as a function of the external conditions irrespective of whether the drive unit is or is not switched on.

On the basis of this fact, the inventive method for controlling an automatic start-up process of an automatically switched-off drive unit of a motor vehicle, during which, in principle, no start-up process of the drive unit is performed, when the absence of a driver is detected and/or suspected, is characterized in that even in the event that the absence of the driver is detected and/or suspected, the drive unit is automatically started when the speed of the motor vehicle is greater than a predetermined limit speed, and all other start-up conditions are met. In this case, the controllability of the vehicle has a higher priority than a suspected absence of the driver. As stated above, a hazardous situation could be avoided by automatically starting the drive unit if, despite the system's detection of the absence of the driver, the driver is sitting in the vehicle.

The absence of the driver may be detected by an evaluation of various signals. It is advantageous for the absence of the driver to be detected by evaluating a driver door contact signal, a driver seat belt buckle signal, a driver seat occupancy detection signal, a foot pedal actuation signal, and/or an interior camera signal. The cited signals can be used individually or in combination in order to detect the absence of the driver. If the signals are evaluated in combination for the purpose of detecting the absence of the driver, then the absence can be detected, for example, when two of the three signals are present such that they detect the absence of the driver. If, for example, the driver door contact signals, the driver seat belt buckle signals and the driver seat occupancy detection signals are evaluated, then the absence of the driver can be detected and/or suspected, when the driver door and the seat belt buckle are open, but the driver seat occupancy detection system detects a seat occupancy. A system for detecting the occupancy of a seat can be constructed, for example, as a seat occupancy mat.

However, in certain situations it may be practical to inhibit such an automatic start-up process. The inhibiting action may be performed either by hand and/or by the system. In the event that the absence of the driver is detected, an automatic start-up of the drive unit is advantageously inhibited, when the driver actuates an operating control element that is intended for this purpose, and/or a towing event is detected.

If a force closure between the drive unit and the drive wheels is detected, then similarly no automatic start of the drive unit should be performed, since this could lead to a situation of enhanced danger, when the driver is actually not in the motor vehicle. Therefore, a detected force closure has an even higher priority than a suspected absence of the driver in the event of a moving vehicle.

In order for the drive unit not to be automatically started unintentionally during drag mode in a car wash, this should also be prevented. In this case there are a number of different options. In a first alternative, the predetermined limit speed can be selected so high that it is not reached during drag mode in the car wash. In a second alternative, an automated car wash mode can be detected by checking the speed of the individual wheels. Only when all wheel speeds exceed a predetermined limit speed, should the automatically switched-off drive unit be automatically re-started despite the detected absence of the driver.

According to the method of the invention, the inventive start control unit for controlling an automatic start-up process of an automatically switched-off drive unit of a motor vehicle that does not, in principle, initiate an automatic start-up process when the absence of the driver is detected and/or suspected, is characterized in that even in the event of a detected and/or suspected absence of the driver, the start control device initiates an automatic start-up process when the speed of the motor vehicle is greater than a predetermined limit speed. The advantageous embodiments of the method of the invention apply analogously to the start control device of the invention.

Other objects, advantages and novel features of the present invention will become apparent from the following detailed description of one or more preferred embodiments when considered in conjunction with the accompanying drawings.

BRIEF DESCRIPTION OF THE DRAWING

The single figure shows an embodiment of the inventive start control device for controlling an automatic start-up process of a drive unit in a motor vehicle.

DETAILED DESCRIPTION OF THE DRAWING

Referring to the figure, the invention is explained in detail with reference to one embodiment.

The start control device A, which is depicted here and which is intended for controlling an automatic start-up process of a drive unit of a motor vehicle, evaluates various start-up conditions B1, B2, and B3 and one other condition v_vG. The start-up condition B3 consists of the requirement that the driver not be absent. That is, it is fulfilled when the absence of the driver is not detected. The condition v_vG is satisfied, when the current speed of the motor vehicle and/or the speed of all of the wheels of the motor vehicle is higher than a predetermined limit speed.

In order to be able to initiate an automatic start, in principle all of the start-up conditions B1, B2 and B3 must be satisfied. Accordingly, an automatic start-up process can be initiated even in the event that the absence of the driver is detected, when the condition v_vG is met.

The inclusive OR operation determines whether at least one of the two input conditions, thus, either the start-up condition B3 or the condition v_vG, is fulfilled. If at least one of the two conditions B3 or v_vG is fulfilled, and if, in addition, the two start-up conditions B1 and B2 are fulfilled, the state is checked in an AND unit 1, and then the start control device A sends a start signal "an" to a start unit that is suitable for automatically starting an internal combustion engine that is not depicted here.

Thus, the invention offers the advantage that in the event that the vehicle moves, the controllability of the motor vehicle is improved by starting the drive unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A start control device for controlling an automatic start-up process of a switched-off drive unit of a motor vehicle, the start control device comprising:
   one or more start-up condition detection units, an automatic start-up process being initiated when all defined start-up conditions are detected, at least one start-up condition being a requirement that an absence of the driver is not detectable;
   a motor vehicle speed determination unit that determines when a speed of the motor vehicle is greater than a predetermined limit speed; and
   wherein the start control device initiates the automatic start-up process even when the absence of the driver is detected by said one start-up condition if the speed of the motor vehicle is greater than the predetermined limit speed and all other defined start-up conditions are met.

2. A method for controlling an automatic start-up process of a drive unit for a motor vehicle, the drive unit being automatically started when all predetermined start-up conditions are fulfilled, one of which is a requirement that an absence of a driver is not detectable, the method comprising the acts of:

determining that said one start-up condition is not met;

determining whether a speed of the motor vehicle is greater than a predetermined limit speed; and automatically starting the drive unit even when said one start-up condition is not met when the speed of the motor vehicle is greater than the predetermined limit speed and all other predetermined start-up conditions of the automatic start-up process of the drive unit are met.

3. The method according to claim 2, wherein the absence of the driver not being detectable is determined by at least one of:

evaluating a driver door contact signal;

evaluating a driver seat belt buckle signal;

evaluating a driver seat occupancy detection signal;

evaluating a foot pedal actuation signal; and evaluating a camera signal.

4. The method according to claim 3, wherein when a plurality of said evaluating signals are used to detect an absence of the driver, the method concludes that the driver is absent when at least a defined number of said evaluating signals indicate the absence of the driver.

5. The method according to claim 2, further comprising the act of inhibiting the automatic start-up of the drive unit when the absence of the driver is detected upon determining a further condition.

6. The method according to claim 5, wherein said further condition is at least one of:

actuation of an operating control element operatively configured for inhibiting the automatic start-up of the drive unit;

detecting an automatic car wash mode;

detecting a vehicle towing event; and detecting a force closure between the drive unit and drive wheels of the vehicle.

7. The method according to claim 6, wherein the detecting of the automatic car wash mode occurs by evaluating individual wheel speeds.

8. The method according to claim 7, wherein the evaluation of individual wheel speeds is performed by determining whether an individual wheel speed is substantially zero and determining whether individual wheel speeds of other wheels significantly differ from zero.

\* \* \* \* \*